(12) United States Patent
Kawahira et al.

(10) Patent No.: US 10,351,033 B2
(45) Date of Patent: Jul. 16, 2019

(54) LOAD DETECTION SENSOR UNIT

(71) Applicant: Fujikura Ltd., Tokyo (JP)

(72) Inventors: Tetsuya Kawahira, Tokyo (JP);
Noriyuki Karasawa, Tokyo (JP);
Shigeru Nakazaki, Tokyo (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/546,382

(22) PCT Filed: Jan. 27, 2016

(86) PCT No.: PCT/JP2016/052387
§ 371 (c)(1),
(2) Date: Jul. 26, 2017

(87) PCT Pub. No.: WO2016/121835
PCT Pub. Date: Aug. 4, 2016

(65) Prior Publication Data
US 2018/0022232 A1 Jan. 25, 2018

(30) Foreign Application Priority Data
Jan. 27, 2015 (JP) .................................. 2015-013670

(51) Int. Cl.
*A61G 5/10* (2006.01)
*G01L 1/20* (2006.01)
(Continued)

(52) U.S. Cl.
CPC ............... *B60N 2/90* (2018.02); *B60N 2/002* (2013.01); *B60N 2/7094* (2013.01); *G01L 1/225* (2013.01);
(Continued)

(58) Field of Classification Search
CPC .... G01L 1/205; H01H 13/78; H03K 17/9625; B60N 2/90; G01G 19/12; G01G 23/02
See application file for complete search history.

(56) References Cited

U.S. PATENT DOCUMENTS

| 5,679,936 A | * | 10/1997 | Schaeffer | ............... | H01H 3/022 |
| | | | | | 200/17 R |
| 5,963,124 A | * | 10/1999 | Buss | ...................... | H01C 10/34 |
| | | | | | 338/118 |

(Continued)

FOREIGN PATENT DOCUMENTS

| CN | 101339854 A | 1/2009 |
| CN | 101379371 A | 3/2009 |

(Continued)

OTHER PUBLICATIONS

Office Action dated Oct. 17, 2017, issued in counterpart Japanese Application No. 2016-572117, with English translation (4 pages).
(Continued)

*Primary Examiner* — Brandi N Hopkins
(74) *Attorney, Agent, or Firm* — Westerman, Hattori, Daniels & Adrian, LLP

(57) ABSTRACT

A load detection sensor unit includes: a load detection sensor which includes a pair of electrodes facing each other with a predetermined gap interposed therebetween and a metal plate covering at least a part of one electrode; and a pressing member that includes a pressing portion pressed against a sheet cushion of a seat device and harder than the sheet cushion, and the pair of electrodes contacts each other when the metal plate is bent in a case in which the pressing portion presses a part of the metal plate.

13 Claims, 10 Drawing Sheets

(51) Int. Cl.
| | |
|---|---|
| *B60N 2/70* | (2006.01) |
| *B60N 2/00* | (2006.01) |
| *B60N 2/90* | (2018.01) |
| *H01H 13/16* | (2006.01) |
| *G01L 1/22* | (2006.01) |
| *H01H 13/04* | (2006.01) |
| *H01H 13/14* | (2006.01) |
| *H01H 13/703* | (2006.01) |
| *H01H 13/10* | (2006.01) |
| *H01H 13/50* | (2006.01) |

(52) U.S. Cl.
CPC ............ *H01H 13/04* (2013.01); *H01H 13/10* (2013.01); *H01H 13/14* (2013.01); *H01H 13/16* (2013.01); *H01H 13/50* (2013.01); *H01H 13/703* (2013.01); *H01H 2231/026* (2013.01)

(56) References Cited

U.S. PATENT DOCUMENTS

| | | | | |
|---|---|---|---|---|
| 5,991,676 | A | * | 11/1999 | Podoloff ............ G01G 19/4142 |
| | | | | 177/144 |
| 2004/0262962 | A1 | * | 12/2004 | Young .................... B60N 2/002 |
| | | | | 297/217.3 |
| 2005/0072249 | A1 | * | 4/2005 | Maeda ................... B60N 2/002 |
| | | | | 73/862.046 |
| 2010/0148549 | A1 | | 6/2010 | Niguet et al. |
| 2014/0246887 | A1 | * | 9/2014 | Clos ....................... B60N 2/002 |
| | | | | 297/217.3 |

FOREIGN PATENT DOCUMENTS

| | | |
|---|---|---|
| EP | 2450229 A2 | 5/2012 |
| JP | 49-098763 U | 8/1974 |
| JP | 2002-228516 A | 8/2002 |
| JP | 2012-121363 A | 6/2012 |
| JP | 5324548 B2 | 10/2013 |
| WO | 98/29849 A2 | 7/1998 |
| WO | 2013/030009 A1 | 3/2013 |
| WO | 2013/178486 A1 | 12/2013 |

OTHER PUBLICATIONS

Office Action dated Apr. 16, 2018, issued in counterpart Chinese Application No. 201680001519.9. (7 pages).

International Search Report dated Mar. 22, 2016, issued in counterpart International Application No. PCT/JP2016/052387 (1 page).

Extended (supplementary) European Search Report dated Sep. 5, 2018, issued in counterpart European Application No. 16743438.0. (8 pages).

Office Action dated Mar. 5, 2019, issued in the counterpart CN Application No. 201680001519.9, with English machine translation. (14 pages).

* cited by examiner

LOAD DETECTION SENSOR UNIT

TECHNICAL FIELD

The present invention relates to a load detection sensor unit suitable for appropriately detecting seating.

BACKGROUND ART

As one of safety systems in vehicles, an alarm system which indicates a seat belt non-wearing state when a person gets on the vehicle has been practically used. In this alarm system, a warning is generated when the wearing of the seat belt is not detected in a state where the seating of a person is detected. As a device for detecting the seating of the person, a seating detection device for detecting a load caused by seating is used in some cases.

As the seating detection device, there is known a load detection sensor having a configuration in which a spacer having an opening is disposed between a pair of resinous films and electrodes formed on the films face each other with a predetermined gap interposed therebetween inside the opening of the spacer. However, since the strength of the resinous film generally decreases in accordance with an increase in temperature, there is a tendency that the resinous film is bent by a weak force. Thus, there is a case in which the strength of the resinous film decreases as described above in a high-temperature environment such as a vehicle interior under a hot weather. In this case, even a case in which a load lighter than a normal person's load is applied to the seat device may be erroneously detected as seating.

Patent Literature 1 below discloses a seating detection device capable of suppressing the above-described erroneous detection. In a load detection sensor used in the seating detection device, a spacer having an opening is disposed between a pair of resinous films, electrodes respectively formed on the films face each other with a predetermined gap interposed therebetween inside the opening of the spacer, and a metal plate is disposed on a surface opposite to the spacer on one film to cover the opening.

According to the seating detection device, since the metal plate has elasticity and the elasticity does not change so much depending on the temperature, it is possible to suppress a change in bending of the film at the time of detecting seating with a temperature by the use of the metal plate. Thus, according to the seating sensor, it is possible to suppress a problem in which a load detecting seating changes in accordance with a temperature.

[Patent Literature 1] Japanese Patent No. 5324548

SUMMARY OF INVENTION

However, when the above-described metal plate is provided, there is concern that the film is not easily bent, the load detection unit is not easily turned on, and the seating is not easily detected compared to a case in which the metal plate is not provided. For this reason, there is a need to devise a load detection device which can be used in a seating detection device capable of suppressing an erroneous seating detection while appropriately detecting seating.

Here, an object of the invention is to provide a load detection sensor unit capable of suppressing an erroneous seating detection while appropriately detecting seating.

To solve the problem, the present invention is a load detection sensor unit which is disposed below a sheet cushion, including: a load detection sensor which includes a pair of electrodes facing each other with a predetermined gap interposed therebetween and a metal plate covering at least a part of one electrode located near the sheet cushion among the pair of electrodes from the sheet cushion; a pressing member that includes a pressing portion pressed against the sheet cushion of a seat device and harder than the sheet cushion, wherein the pair of electrodes contacts each other when the metal plate is bent in a case in which the pressing portion presses a part of the metal plate.

In such a load detection sensor unit, one electrode located near the sheet cushion is pressed by the bending of the metal plate pressed by the pressing portion and is brought into contact with the other electrode so that the switch is turned on. Incidentally, the flexibility of the metal does not change too much as described above even when a temperature changes. Thus, a bending way of the metal plate pressed by the pressing portion does not change even when an environment temperature around the load detection sensor unit changes. Thus, according to the load detection sensor unit, it is possible to suppress an erroneous seating detection even when an environment temperature changes. Further, in the load detection sensor unit, since the pressing portion which is harder than the sheet cushion presses a part of the metal plate, the metal plate can be appropriately bent compared to a case in which the sheet cushion directly presses the metal plate and thus the seating can be appropriately detected. Further, since creep hardly occurs in metal compared to a resin, the metal plate is not pressed even when a part thereof is pressed by the pressing member. Thus, according to the load detection sensor unit of the invention, it is possible to suppress an erroneous seating detection due to pressing or the like while appropriately detecting seating.

Furthermore, it is preferable that the pressing member further includes a pressure receiving surface pressed against the sheet cushion, and an area of the pressure receiving surface is larger than an area in which the pressing portion contacts the metal plate.

Since the area of the pressure receiving surface pressed against the sheet cushion is larger than the area of the pressing portion contacting the metal plate, a pressing force received in a wide surface can concentrate on the pressing portion and thus the metal plate can be more appropriately bent. Thus, the seating can be more appropriately detected.

In this case, it is preferable that the area of the pressure receiving surface is larger than an area of the one electrode.

Since the area of the pressure receiving surface is larger than the area of the electrode pressed by the pressing portion, the sheet cushion can transmit a force to the pressure receiving surface from a position other than a position directly above the electrode. For this reason, since a pressing force can more appropriately concentrate on the pressing portion, the metal plate can be more appropriately bent. As a result, the seating can be more appropriately detected.

Furthermore, it is preferable that the pressing portion contacts the metal plate while not being pressed against the sheet cushion.

Since the pressing portion contacts the metal plate while not being pressed against the sheet cushion, the pressing portion can promptly press the metal plate when the sheet cushion presses the pressing member. Thus, the seating can be promptly detected.

Furthermore, it is preferable that a first movement regulation member that regulates a relative movement between the pressing member and the metal plate in a plane direction of the metal plate is further included.

Since the relative positional deviation between the pressing portion and the metal plate is suppressed by the first movement regulation member, it is possible to suppress a problem in which the pressing portion presses a portion other than the metal plate.

Furthermore, it is preferable that the load detection sensor further includes a sheet-shaped spacer having an opening formed therein and a pair of insulation sheets formed on both surfaces of the spacer, the pair of electrodes is provided on a surface near the spacer in the insulation sheet and faces each other with the opening interposed therebetween, and the metal plate is provided at the opposite side to the spacer of the one insulation sheet.

In this case, the insulation sheet and the electrode on the insulation sheet are pressed by the bending of the metal plate pressed by the pressing portion and thus the electrodes contact each other. According to such a load detection sensor unit, since the electrode is provided on the insulation sheet, it is possible to suppress an unnecessary short-circuit between the electrode and other conductive members. Further, since the bending way of the metal plate does not change too much as described above even when the flexibility of the insulation sheet changes in accordance with a change in temperature, it is possible to suppress an erroneous seating detection due to a temperature.

Furthermore, it is preferable that the pair of insulation sheets and the metal plate do not adhere to each other.

In general, the insulation sheet and the metal plate have different thermal expansion coefficients. Thus, a partial position of the insulation sheet and a partial position of the metal plate are apt to be deviated from each other when a temperature changes. In this case, there is concern that an unnecessary stress is applied to the electrode on the insulation sheet when the insulation sheet and the metal plate adhere to each other. However, when the insulation sheet and the metal plate do not adhere to each other, it is possible to suppress a problem in which an unnecessary stress is applied to the electrode as described above even when the insulation sheet and the metal plate expand at different expansion coefficients due to a change in temperature.

In this case, it is preferable that a movement regulation member that regulates a relative movement between the pair of insulation sheets and the metal plate in a plane direction of the pair of insulation sheets is further included.

According to such a configuration, it is possible to suppress a problem in which the metal plate does not cover the electrode due to a positional deviation between the metal plate and the insulation sheet by the use of the movement regulation member.

Furthermore, it is preferable that the movement regulation member is a part of a housing accommodating the load detection sensor.

There is a case in which the load detection sensor unit includes a housing. In this case, the load detection sensor is used while being accommodated inside the housing. Thus, since a part of the housing becomes the movement regulation member, there is no need to provide a separate movement regulation member in addition to the housing. Thus, the load detection sensor unit can have a simple configuration when the load detection sensor unit includes the housing.

Further, when the pair of insulation sheets is used as described above, it is desirable that a portion which covers at least the electrode in the metal plate be separated from the insulation sheet.

Since the metal plate is separated from the insulation sheet, it is possible to suppress the contact of the electrode due to a slight bending of the metal plate. Thus, it is possible to suppress a problem in which seating is detected by the arrangement of a baggage on a seat surface.

In this case, it is preferable that the metal plate is formed of bimetal which is deformed to be separated from the electrode in accordance with an increase in temperature.

Generally, when the insulation sheet is formed of a resin and the electrode is formed on the resinous insulation sheet, the insulation sheet is deformed by a weak force in accordance with an increase in temperature so that the electrodes easily contact each other due to a feature that the resin is easily defamed in accordance with an increase in temperature. Here, since the metal plate is formed of bimetal which is deformed to be separated from the electrode in accordance with an increase in temperature as described above, the electrodes easily contact each other at a weak force as described above when the temperature increases. Accordingly, it is possible to suppress a change in seating detection in that the metal plate is separated from the electrode so that the metal plate cannot easily press the insulation sheet. Thus, the seating can be more appropriately detected.

Furthermore, the one electrode covered by the metal plate may be integrated with the metal plate and the electrode is a part of the metal plate.

As described above, according to the invention, a load detection sensor unit capable of suppressing an erroneous seating detection while appropriately detecting seating is provided.

BRIEF DESCRIPTION OF DRAWINGS

FIG. 7 is a diagram illustrating a state where the load detection sensor of FIG. 3 is turned on.

DESCRIPTION OF EMBODIMENTS

Hereinafter, preferred embodiments of a load detection sensor unit according to the invention will be described in detail with reference to the drawings. For comprehension, the scale of each drawing may be different from the scale described in the following description.

(First Embodiment)

Figure 1:
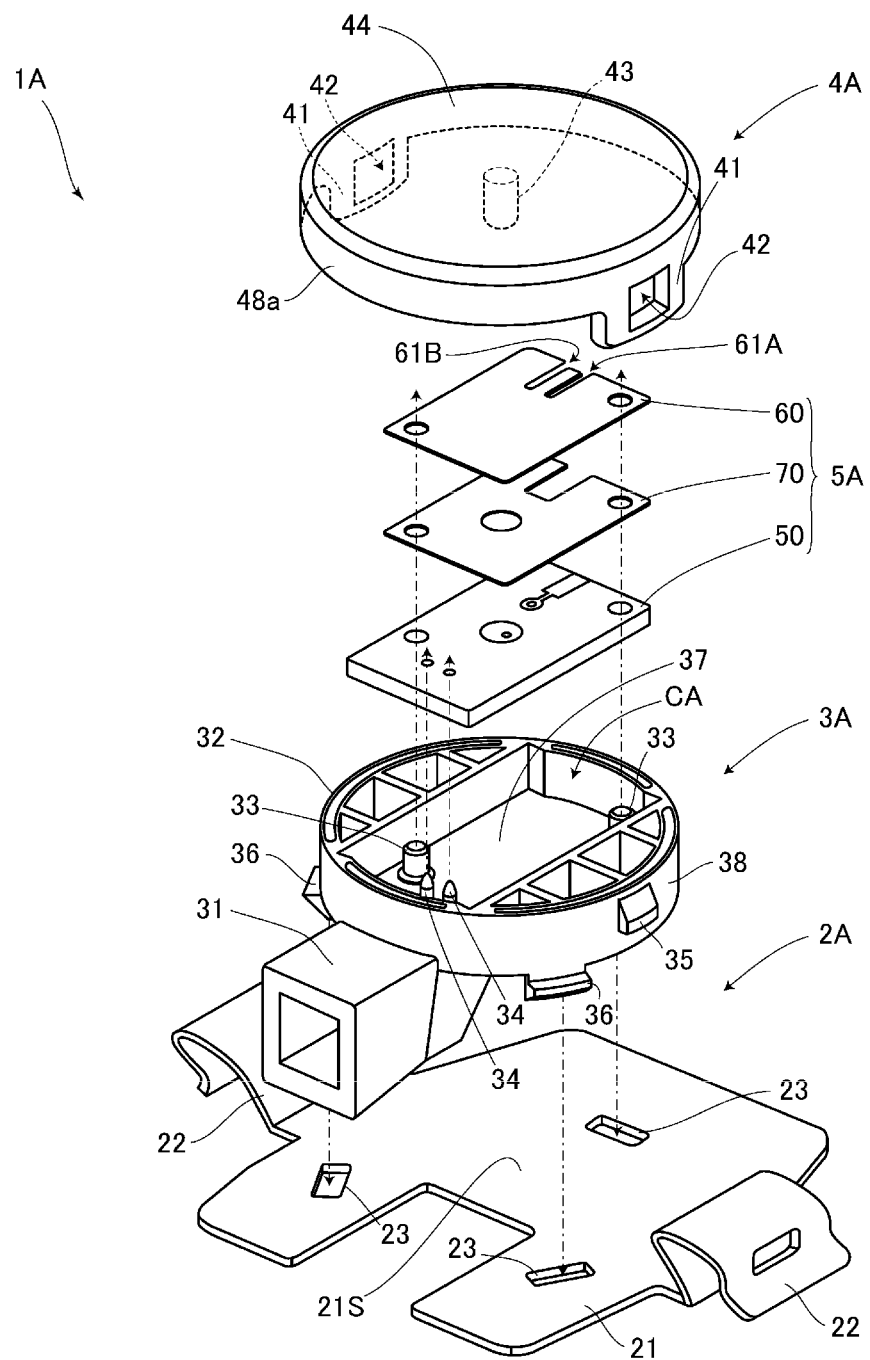
FIG. 1 is an exploded view illustrating a configuration of a load detection sensor unit according to a first embodiment of the invention.
Figure 2:
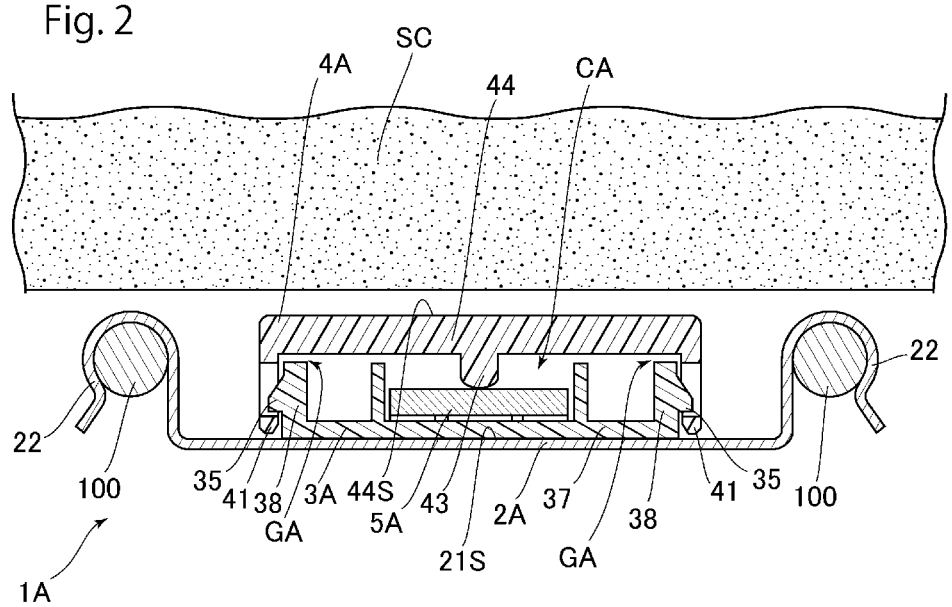
FIG. 2 is a cross-sectional view illustrating a state where the load detection sensor unit of FIG. 1 is attached to an S spring.

FIG. 1 is an exploded view illustrating a configuration of a load detection sensor unit of an embodiment and FIG. 2 is a cross-sectional view illustrating a state where the load detection sensor unit is attached to an S spring of a seat device. Additionally, FIG. 2 is a cross-sectional view of the load detection sensor unit in a plane along the left and right direction of the seat device. As illustrated in FIGS. 1 and 2, a load detection sensor unit 1A mainly includes a pedestal 2A, a housing 3A, a housing cover 4A, and a load detection sensor 5A.

The pedestal 2A includes a placement portion 21 on which the housing 3A is placed and a pair of hook portions 22 which is connected to the placement portion 21. An upper surface of the placement portion 21 is formed as a placement surface 21S on which the housing 3A is placed. Further, the placement portion 21 is provided with a plurality of penetration holes 23 which are formed from the placement surface 21S to a lower surface of the placement portion 21 (a surface opposite to the placement surface 21S) to penetrate the surfaces. The pedestal 2A is formed by molding, for example, a metal plate. In this case, a plate thickness is, for example, 0.8 mm.

The pair of hook portions 22 is respectively provided at positions facing each other with the placement portion 21 interposed therebetween and is respectively fitted to the pair of adjacent S springs 100 in the plurality of S springs 100 stretched across the opening of the frame of the seat device of the vehicle. Thus, each of the hook portions 22 is a locking portion which locks the pedestal 2A to the S spring 100. In the embodiment, the pair of hook portions 22 is arranged in the lateral direction of the seat device and is fitted into the pair of S springs 100 which is adjacent to each other in the lateral direction. Further, in a state where the pair of hook portions 22 is fitted to the pair of adjacent S springs 100, the placement portion 21 is located below the sheet cushion SC placed on the plurality of S springs 100 and the placement portion 21 is disposed between the pair of S springs 100 when the plurality of S springs are viewed from above. As described above, in the embodiment, the placement surface 21S is located below a lower end of each of the S springs 100 while the pair of hook portions 22 is fitted into the pair of S springs 100.

As illustrated in FIGS. 1 and 2, the housing 3A includes a connector portion 31 which is connected to a vehicle control unit (not illustrated) and a switch accommodation portion 32 which is connected to the connector portion 31. The switch accommodation portion 32 includes a bottom wall 37 and a frame wall 38 and an accommodation space CA which accommodates the load detection sensor 5A is formed by the bottom wall 37 and the frame wall 38. Additionally, in the embodiment, the frame wall 38 is subjected to drawing in order to suppress deformation during resin molding.

The bottom wall 37 of the switch accommodation portion 32 is provided with a pair of fixing pins 33 and a pair of connection pins 34. The pair of fixing pins 33 corresponds to pins for fixing the load detection sensor 5A accommodated in the housing 3A. Further, the pair of connection pins 34 corresponds to pins which are respectively electrically connected to the connector terminal of the connector portion 31 and the load detection sensor 5A so that the connector terminal is electrically connected to the load detection sensor 5A. Additionally, in FIG. 1, the connector terminal of the connector portion 31 is not illustrated.

A pair of protrusion pieces 35 is provided on the outer surface of the frame wall 38 of the switch accommodation portion 32. In the embodiment, the pair of protrusion pieces 35 is provided to be lined up in the lateral direction of the seat. Further, a lower end of the frame wall 38 is provided with a plurality of hook pieces 36 respectively fitted into the penetration holes 23 of the pedestal 2A. When each hook piece 36 is fitted into each penetration hole 23 of the pedestal 2A, the housing 3A is fixed to the pedestal 2A so that the housing 3A is placed on the placement surface 21S of the pedestal 2A as described above.

The housing cover 4A is a lid member that covers the accommodation space CA of the switch accommodation portion 32 and is a pressing member that is pressed against the sheet cushion SC to press the switch of the load detection sensor 5A. The housing cover 4A includes a top wall 44 and a frame wall 48a. A pair of arms 41 is provided in a lower end of the frame wall 48a of the housing cover 4A. Each arm 41 is provided with an opening 42 through which a protrusion piece 35 provided in the frame wall 38 of the switch accommodation portion 32 of the housing 3A is fitted. When the pair of protrusion pieces 35 of the housing 3A is respectively fitted into the openings 42 of the pair of arms 41, the housing cover 4A is locked to the housing 3A. Thus, the pair of arms 41 sandwiches the housing 3A from the lateral direction of the seat while the housing cover 4A is locked to the housing 3A.

The top wall 44 of the housing cover 4A is provided with a pressing portion 43 which protrudes from an inner surface facing the bottom wall 37 of the switch accommodation portion 32 of the housing 3A. A front end of the pressing portion 43 is formed in a protruding curved surface shape and the front end thereof contacts the switch of the load detection sensor 5A while the housing cover 4A covers the housing 3A and each protrusion piece 35 is fitted into each opening 42. That is, the front end of the pressing portion 43 contacts the switch of the load detection sensor 5A while the housing cover 4A is not pressed against the sheet cushion SC as described below.

Additionally, the housing cover 4A is formed of a material which is harder than the sheet cushion SC. Thus, the pressing portion 43 which is a part of the housing cover 4A is also formed of a material harder than the sheet cushion SC. Generally, since the sheet cushion SC is formed of a foamed urethane resin, polycarbonate (PC), polyamide (PA), polybutylene terephthalate (PBT), phenol resin, epoxy resin, and the like can be exemplified as a material of the housing cover 4A.

In this way, the top wall 44 of the housing cover 4A and the frame wall 38 of the housing 3A are separated from each other to form a gap GA as illustrated in FIG. 2 in a state where the pressing portion 43 of the housing cover 4A contacts the load detection sensor 5A.

In a state where the load detection sensor unit 1A assembled in this way is attached to the pair of S springs 100, the top surface 44S of the top wall 44 of the housing cover 4A faces the lower surface of the sheet cushion SC with a predetermined distance interposed therebetween. The top surface 44S is formed in a flat surface shape. The top surface 44S is a surface which is pressed by the sheet cushion SC and can be understood as a pressure receiving surface of the load detection sensor unit 1A. The area of the top surface 44S is set to be larger than an area in which the pressing portion 43 contacts the switch of the load detection sensor 5A.

Next, the load detection sensor 5A which is accommodated in the switch accommodation portion 32 of the housing 3A will be described.

Figure 3:
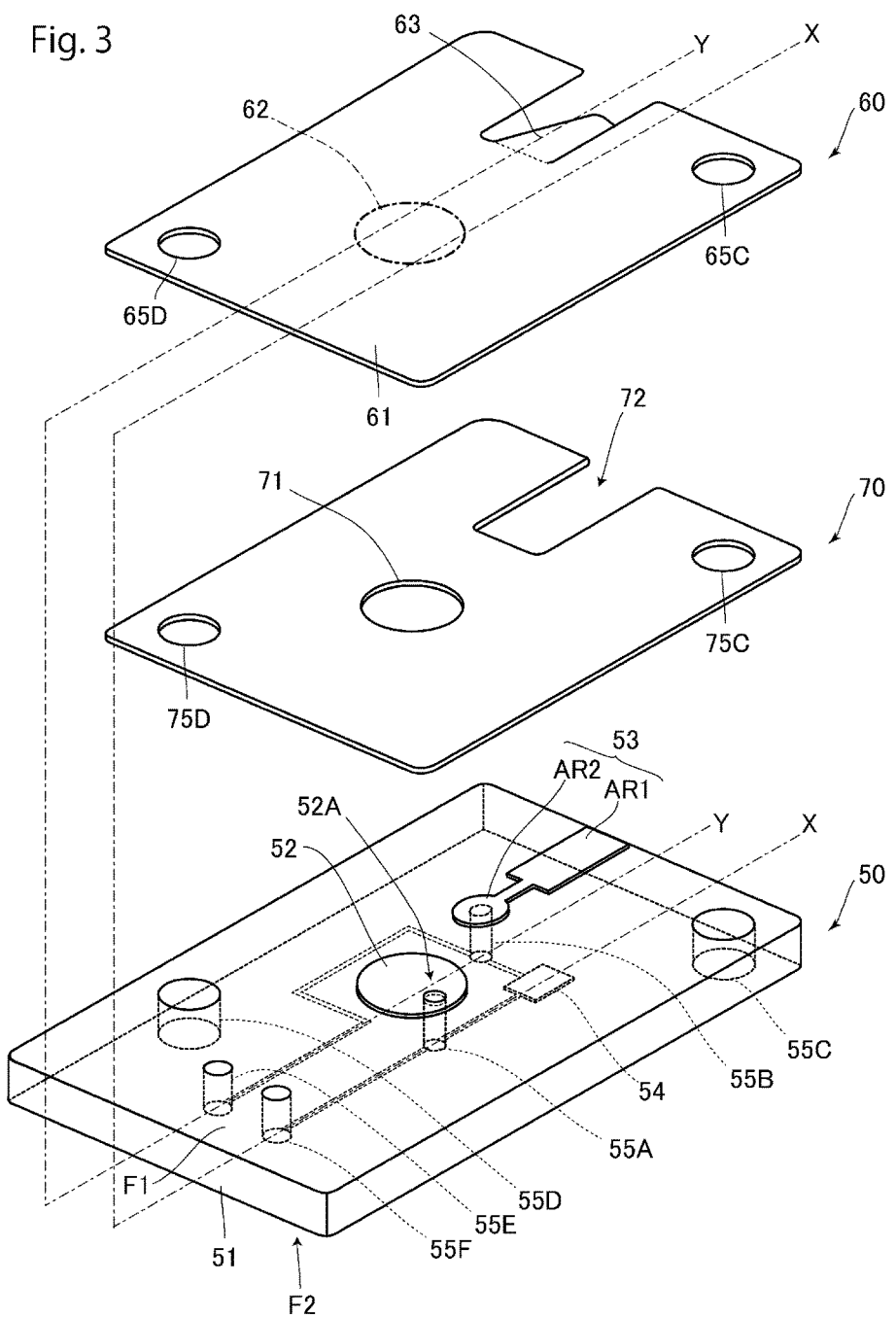
FIG. 3 is an exploded view illustrating a configuration of a load detection sensor of FIG. 1.

FIG. 3 is an exploded view illustrating a configuration of the load detection sensor 5A. Further, FIG. 4 is a cross-sectional view taken along a line X-X of the load detection sensor 5A illustrated in FIG. 3 and FIG. 5 is a cross-sectional view taken along a line Y-Y of the load detection sensor 5A illustrated in FIG. 3.

Figure 4:
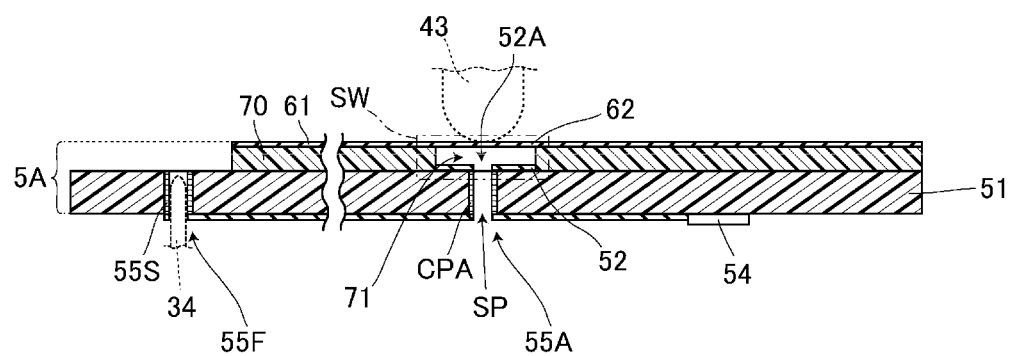
FIG. 4 is a cross-sectional view taken along a line X-X of the load detection sensor of FIG. 3.
Figure 5:
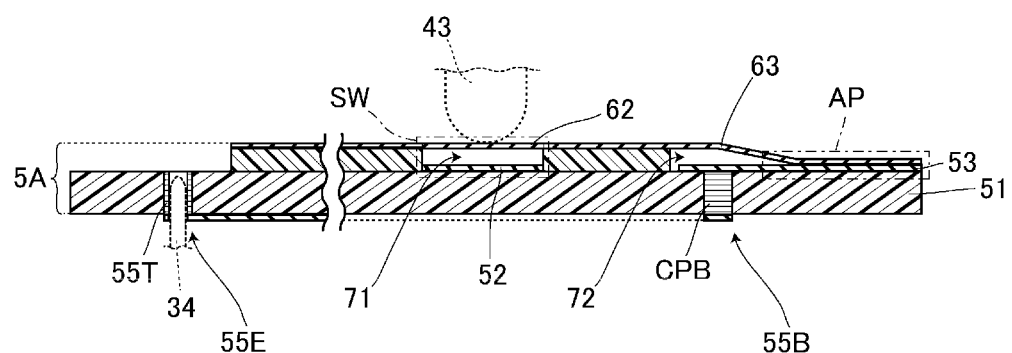
FIG. 5 is a cross-sectional view taken along a line Y-Y of the load detection sensor of FIG. 3.

As illustrated in FIGS. 3 to 5, the load detection sensor 5A mainly includes a first electrode sheet 50, a second electrode sheet 60, and a spacer 70.

The first electrode sheet 50 includes, for example, an insulation substrate 51 having little flexibility. As a material of the substrate 51, a phenol resin, an epoxy resin, and the like can be exemplified. A first electrode 52 and a first contact point 53 are disposed on one surface F1 facing the second electrode sheet 60 in the substrate 51.

The first electrode 52 is an electrode which constitutes the switch SW and is formed as, for example, a circular metal printed layer. Further, the first contact point 53 includes a substantially rectangular contact area AR1 which contacts the second electrode sheet 60 and a non-contact area AR2 which does not contact the second electrode sheet 60, the two areas being connected to each other.

The other surface F2 which is opposite to one surface F1 in the substrate 51 is formed as a lower surface of the load detection sensor 5A and a resistance 54 is disposed on the other surface F2. The resistance 54 is a resistance for detecting a short-circuit and in the embodiment, the resistance 54 is configured as a chip resistance.

The substrate 51 is provided with a plurality of penetration holes which are formed from one surface F1 to the other surface F2 of the substrate 51 to penetrate the surfaces and the holes are a first sheet penetration hole 55A, a second sheet penetration hole 55B, fixing penetration holes 55C and 55D, and pin penetration holes 55E and 55F.

The first sheet penetration hole 55A is a sheet penetration hole in which an opening is located within an area where the first electrode 52 is disposed in one surface F1 of the substrate 51. A first conductive member CPA is provided inside the first sheet penetration hole 55A and the first electrode 52 is electrically connected to a circuit portion which is disposed on the other surface F2 of the substrate 51 through the first conductive member CPA. Accordingly, the first conductive member CPA and the resistance 54 are electrically connected to each other, so that the first electrode 52 and the resistance 54 are electrically connected to each other. Further, the first conductive member CPA is provided on an inner peripheral surface of the first sheet penetration hole 55A and an air hole SP which is surrounded by the first conductive member CPA is formed inside the first sheet penetration hole 55A.

The second sheet penetration hole 55B is a sheet penetration hole in which an opening is located within an area where the first contact point 53 is disposed on one surface F1 of the substrate 51. In the embodiment, the opening of the second sheet penetration hole 55B is located within the non-contact area AR2 of the first contact point 53.

A second conductive member CPB is charged into the second sheet penetration hole 55B. The circuit portion disposed on the other surface F2 of the substrate 51 and the non-contact area AR2 of the first contact point 53 are electrically connected to each other through the second conductive member CPB and the second conductive member CPB is connected to the resistance 54 on the other surface F2 of the substrate 51. Thus, the resistance 54 and the first contact point 53 are electrically connected to each other. Since the first electrode 52 and the resistance 54 are electrically connected to each other as described above, the first electrode 52, the resistance 54, and the first contact point 53 are electrically connected in series to one another in this order.

The fixing penetration holes 55C and 55D are penetration holes through which the pair of fixing pins 33 provided in the bottom wall 37 of the switch accommodation portion of the housing 3A is inserted. The diameters of the fixing penetration holes 55C and 55D are set to be substantially equal to the outer diameters of the pair of fixing pins 33.

The pin penetration holes 55E and 55F are penetration holes through which the pair of connection pins 34 provided in the housing 3A is inserted. A terminal 55T which is one terminal portion of an electric circuit of the load detection sensor 5A is provided inside the pin penetration hole 55E and a terminal 55S which is the other terminal portion of the electric circuit of the load detection sensor 5A is provided inside the pin penetration hole 55F. The terminal 55T is electrically connected to a contact point between the first electrode 52 and the resistance 54 and the terminal 55S is electrically connected to a contact point between the resistance 54 and the first contact point 53. Further, the terminals 55T and 55S are provided along inner peripheral surfaces of the corresponding pin penetration holes 55E and 55F and a width of a space which is surrounded by the terminals 55T and 55S is set to be substantially equal to the outer diameter of the connection pin 34. When the pair of connection pins 34 is inserted through the pin penetration holes 55E and 55F, the terminal 55T is electrically connected to one connection pin 34 and the terminal 55S is electrically connected to the other connection pin 34.

The second electrode sheet 60 is formed of a metal plate 61 and mainly includes a second electrode 62 and a second contact point 63.

The metal plate 61 is formed of thin metal having flexibility and is formed, in the embodiment, in a thin cuboid shape which has a vertical width shorter than the vertical width of the substrate 51 and a horizontal width equal to the horizontal width of the substrate 51. The material of the metal plate 61 is not particularly limited as long as metal has conductivity. For example, copper or stainless steel can be exemplified.

The metal plate 61 is provided with fixing penetration holes 65C and 65D which are formed from one surface to the other surface of the metal plate 61 so as to penetrate the surfaces. The fixing penetration holes 65C and 65D are penetration holes through which the pair of fixing pins 33 provided in the bottom wall of the switch accommodation portion of the housing 3A is inserted and are formed to have the same shape and size as those of the fixing penetration holes 55C and 55D formed in the substrate 51 of the first electrode sheet 50. Further, the arrangement portions of the second electrode 62 and the second contact point 63 with respect to the fixing penetration holes 65C and 65D and the arrangement portions of the first electrode 52 and the first contact point 53 with respect to the fixing penetration holes 55C and 55D of the first electrode sheet 50 have the same positional relation. When the first electrode sheet 50 and the metal plate 61 overlap each other, the fixing penetration hole 55C and the fixing penetration hole 65C overlap each other and the fixing penetration hole 55D and the fixing penetration hole 65D overlap each other.

The second electrode 62 is the other electrode which constitutes the switch SW and in the embodiment is formed as a portion which faces the first electrode 52 through the spacer 70 in the metal plate 61. That is, a part of the metal plate 61 serves as the second electrode 62. Thus, as illustrated in FIGS. 1 and 2, the second electrode 62 located near the sheet cushion SC among the first electrode 52 and in the second electrode 62 is covered by the metal plate 61 from the sheet cushion and can be understood that the electrode is integrated with the metal plate 61 as described above. Additionally, for example, a metal layer formed of a material which is the same as or different from the metal plate 61 may be disposed as the second electrode 62 at a portion facing the first electrode 52 through the spacer 70 in the metal plate 61.

The second contact point 63 is one member that constitutes a connection maintaining portion AP and in the embodiment formed as a leaf spring. That is, the metal plate 61 is provided with a pair of notches 61A and 61B (FIG. 1) which extends from one end to the other end of the metal plate 61 so as to be separated from each other by a predetermined distance and a portion which is interposed between the notches 61A and 61B is formed as the second contact point 63. Further, the second contact point 63 is formed as a leaf spring in such a manner that a base of the second contact point 63 is bent toward the first electrode sheet 50 so that the second contact point 63 is inclined with respect to a plate surface of the metal plate 61. In this way, a portion which is different from the portion formed as the second electrode 62 in the metal plate 61 is formed as the second contact point 63. A position of the second contact point 63 is set to a position overlapping the contact area AR1 of the first contact point 53 when the first electrode sheet 50 and the second electrode sheet 60 overlap each other. Additionally, a shape of the leaf spring formed as the second contact point 63 may be, for example, a trapezoidal shape in which a width of a base is larger than a width of an opening end or various shapes other than a rectangle and a trapezoid are applicable. Further, a metal layer formed of a material which is the same as or different from the metal plate 61 may be formed as the second contact point 63 on the side of the first electrode sheet 50 in the metal plate 61.

The spacer 70 is a thin insulation member that is interposed between the first electrode sheet 50 and the second electrode sheet 60 and in the embodiment is formed to have the same shape and size as those of a portion in which the second contact point 63 is removed from the metal plate 61. As a material of the spacer 70, a resin such as PET, PI, or PEN can be exemplified.

An opening 71 is formed in the spacer 70. The opening 71 is formed at a position overlapping the first electrode 52 and the second electrode 62 in the vertical direction between the first electrode 52 disposed on the substrate 51 and the second electrode 62 of the metal plate 61 facing the first electrode 52. The size of the opening 71 is set to be slightly smaller than the size of the first electrode 52.

Further, the spacer 70 is provided with a slit-shaped opening 72. The opening 72 is formed at a position overlapping the first contact point 53 and the second contact point 63 in the vertical direction between the first contact point 53 disposed on the substrate 51 and the second contact point 63 of the metal plate 61 facing the first contact point 53. The size of the opening 72 is set to be slightly larger than the size of the leaf spring formed as the second contact point 63 in the metal plate 61.

Further, the spacer 70 is provided with fixing penetration holes 75C and 75D which are formed from one surface to the other surface of the spacer 70 to penetrate the surfaces. The fixing penetration holes 75C and 75D are penetration holes through which the fixing pins 33 provided in the bottom wall of the switch accommodation portion of the housing 3A are inserted and are formed to have the same size as those of the fixing penetration holes 55C and 55D formed in the substrate 51 of the first electrode sheet 50. Further, the arrangement portions of the opening 71 and the opening 72 with respect to the fixing penetration holes 75C and 75D of the spacer 70 and the arrangement portions of the first electrode 52 and the first contact point 53 with respect to the fixing penetration holes 55C and 55D of the first electrode sheet 50 have the same positional relation. Thus, when the first electrode sheet 50, the spacer 70, and the second electrode sheet 60 overlap one another, the fixing penetration hole 55C, the fixing penetration hole 65C, and the fixing penetration hole 75C overlap one another and the fixing penetration hole 55D, the fixing penetration hole 65D, and the fixing penetration hole 75C overlap one another.

The first electrode sheet 50, the second electrode sheet 60, and the spacer 70 overlap one another to form the load detection sensor 5A. In the load detection sensor 5A, as illustrated in FIG. 4, the first electrode 52 and the second electrode 62 face each other with the opening 71 interposed therebetween to form the switch SW. In a state where the first electrode 52 and the second electrode 62 are separated from each other, a distance between the first electrode 52 and the second electrode 62 is set to, for example, 0.1 mm. Then, the air hole SP formed inside the electrode penetration hole 52A communicates with the opening 71. Thus, unnecessary air can be discharged from the air hole SP to the outside of the load detection sensor 5A when the second electrode 62 is bent to contact the first electrode 52. In this way, the first sheet penetration hole 55A serves as a hole used to electrically connect the first electrode 52 disposed on one surface F1 of the substrate 51 and the circuit portion disposed on the other surface F2 and also serves as an exhaust hole discharging air inside the opening 71 to the outside of the load detection sensor 5A.

Further, as described above, in the load detection sensor 5A, the second contact point 63 of the second electrode sheet 60 is formed as the leaf spring and is plastically deformed with respect to the plate surface of the metal plate 61 to be inclined normally. For this reason, as illustrated in FIG. 5, the second contact point 63 passes through the opening 72 formed as the notch of the spacer 70 and is connected to the contact area AR1 of the first contact point 53 of the first electrode sheet 50. In this way, the connection maintaining portion AP is formed when the first contact point 53 and the second contact point 63 contact each other. That is, the first contact point 53 of the first electrode sheet 50 is one member that forms the connection maintaining portion AP maintaining an electrical connection even when an external pressure is not applied to the housing cover 4A and the second contact point 63 of the second electrode sheet 60 is formed as the other member foaming the connection maintaining portion AP.

Such a load detection sensor 5A is fixed to the housing 3A as illustrated in FIG. 1 in such a manner that the pair of fixing pins 33 of the housing 3A is inserted through the fixing penetration holes 55C and 55D of the first electrode sheet 50, the fixing penetration holes 75C and 75D of the spacer 70, and the fixing penetration holes 65C and 65D of the second electrode sheet 60 in this order.

In a state where the load detection sensor 5A is fixed to the housing 3A, the pair of connection pins 34 is respectively inserted into the pin penetration holes 55E and 55F of the first electrode sheet 50. Accordingly, the terminals 55T and 55S provided inside the pin penetration holes 55E and 55F contact the corresponding connection pins 34 and are electrically connected to the connector terminal of the connector portion 31 of the housing 3A through the connection pin 34.

Further, a front end of the pressing portion 43 contacts a position opposite to the first electrode 52 of the second electrode 62 in the switch SW by the attachment of the housing cover 4A. An area in which the pressing portion 43 contacts the second electrode 62 is smaller than an area of the second electrode 62 and an area of the top surface 44S corresponding to the pressure receiving surface is larger than an area of the second electrode 62. In this way, a relative movement between the housing cover 4A and the load detection sensor 5A in the plane direction of the metal plate 61 is regulated while the load detection sensor 5A is fixed to the housing 3A and the housing cover 4A is attached thereto. The regulation of the relative movement is performed in such a manner that the pair of fixing pins 33 regulates the movement of the load detection sensor 5A with respect to the housing 3A and the pair of aims 41 regulates the movement of the housing cover 4A with respect to the housing 3A in the horizontal direction. Thus, in the embodiment, the pair of fixing pins 33 and the pair of aims 41 constitute a first movement regulation member that regulates the relative movement between the housing cover 4A and the metal plate 61 in the plane direction of the metal plate 61.

Figure 6:
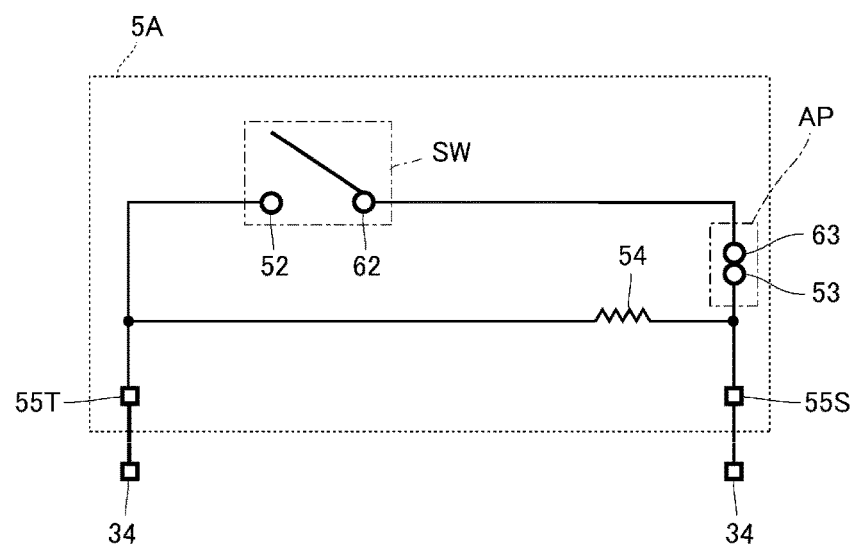
FIG. 6 is a diagram illustrating an equivalent circuit of the load detection sensor of FIG. 3.

FIG. 6 is a diagram illustrating an equivalent circuit of the load detection sensor 5A fixed to the housing 3A. As illustrated in FIG. 6, the switch SW (the first electrode 52 and the second electrode 62) and the connection maintaining portion AP (the first contact point 53 and the second contact point 63) are connected to each other between the pair of terminals 55T and 55S which corresponds to circuit terminals of the load detection sensor 5A. The switch SW is electrically connected between the pair of terminals 55T and 55S and is connected to the connector terminal provided in the connector portion 31 of the housing 3A through the pair of terminals 55T and 55S. Further, since the resistance 54 is electrically connected to the first electrode 52 and the first contact point 53 as described above, the resistance 54 is electrically connected in parallel to the switch SW. Thus, when the switch SW is turned on, a resistance value between the terminals 55T and 55S is lower than that of a case in which the switch SW is turned off.

Next, a case in which seating is detected by the load detection sensor unit 1A of the embodiment will be described.

When a person sits on the seat device, the lower surface of the sheet cushion SC moves downward by the weight of the person and the lower surface of the sheet cushion SC contacts the top surface 44S of the housing cover 4A. When the lower surface of the sheet cushion SC moves further downward, the lower surface of the sheet cushion SC presses the top surface 44S of the housing cover 4A. Then, since the gap GA is formed between the housing cover 4A and the housing 3A as described above when the lower surface of the sheet cushion SC moves further downward, the housing cover 4A moves downward within the range of the gap GA.

Figure 7:
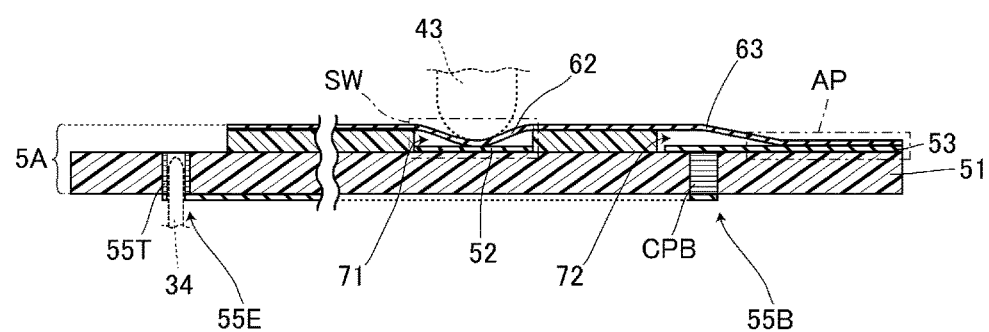

FIG. 7 is a diagram illustrating a state where the load detection sensor 5A is turned on. The front end of the pressing portion 43 presses the second electrode 62 by the downward movement of the housing cover 4A and then the second electrode 62 contacts the first electrode 52 so that the switch SW of the load detection sensor 5A is turned on as illustrated in FIG. 7. That is, the second electrode 62 contacts the first electrode 52 by the bending of the metal plate 61 when the pressing portion 43 presses the metal plate 61. For this reason, a resistance value between the pair of terminals 55T and 55S decreases and a change in resistance is detected by a vehicle control unit (not illustrated) through the connection pin 34 and the connector terminal. In this way, the seating is detected.

At this time, since an area of the top surface 44S corresponding to the pressure receiving surface pressed against the sheet cushion SC is set to be larger than an area of a portion contacting the second electrode 62 corresponding to the front end of the pressing portion 43 as described above, a pressing force received in a wide surface can concentrate on the pressing portion 43 and thus the metal plate 61 can be appropriately bent. Particularly, in the embodiment, since the front end of the pressing portion 43 is formed in a protruding curved surface shape, a pressing force can be applied to the metal plate 61 at a higher density compared to a case in which the front end of the pressing portion 43 is formed in a flat surface shape and thus the metal plate 61 can be bent more appropriately. Further, since an area of the top surface 44S is larger than an area of the second electrode 62 as described above, the sheet cushion SC can apply a force from a position except for a position directly above the second electrode 62 to the top surface 44S. For this reason, since a pressing force can more appropriately concentrate on the pressing portion 43, the metal plate 61 can be more appropriately bent.

As described above, in the load detection sensor unit 1A of the embodiment, the second electrode 62 is formed as a portion facing the first electrode 52 in the metal plate 61 and a part of the metal plate 61 serves as the second electrode 62. Incidentally, the flexibility of the metal does not change much even when a temperature changes. Thus, a bending way of the metal plate 61 pressed against the pressing portion 43 does not change much even when an environment temperature around the load detection sensor unit 1A changes. Thus, according to the load detection sensor unit 1A, an erroneous seating detection can be suppressed even when the environment temperature changes. Further, in the load detection sensor unit 1A, since the pressing portion 43 which is harder than the sheet cushion SC presses a part of the metal plate 61, the metal plate 61 can be appropriately bent compared to a case in which the sheet cushion SC directly presses the metal plate 61 and thus the seating can be appropriately detected. Further, since creep hardly occurs in metal compared to a resin, the metal plate 61 is not pressed even when a part thereof is pressed by the pressing portion 43. Thus, according to the load detection sensor unit 1A of the invention, it is possible to suppress an erroneous seating detection due to pressing or the like while appropriately detecting the seating.

Further, in the embodiment, the front end of the pressing portion 43 contacts the metal plate 61 while the top surface 44S of the housing cover 4A is not pressed against the sheet cushion SC as described above. Thus, the pressing portion 43 can promptly press the metal plate 61 when the sheet cushion SC presses the housing cover 4A corresponding to the pressing member. Thus, the seating can be promptly detected.

Further, in the embodiment, the first movement regulation member that includes the pair of fixing pins 33 and the pair of auras 41 and regulates the relative movement between the housing cover 4A and the metal plate 61 in the plane direction of the metal plate 61 is provided as described above. Thus, since it is possible to suppress the relative positional deviation between the pressing portion 43 and the metal plate 61, it is possible to suppress the pressing portion 43 from pressing a portion other than the metal plate 61.

Further, in the load detection sensor 5A of the embodiment, a portion including the second contact point 63 in the second electrode sheet 60 is formed as a leaf spring which is formed by bending the metal plate 61 and presses the second contact point 63 against the first contact point 53. For this reason, other members that normally maintain the connection state between the first contact point 53 and the second contact point 63 cannot be needed. Thus, it is possible to suppress an increase in the number of components and a decrease in size.

(Second Embodiment)

Next, a second embodiment of the invention will be described. Additionally, in the description of the embodiment, the same reference numerals will be given to the components which are the same as or equivalent to those of the first embodiment and a repetitive description thereof will be omitted unless otherwise specified.

Figure 8:
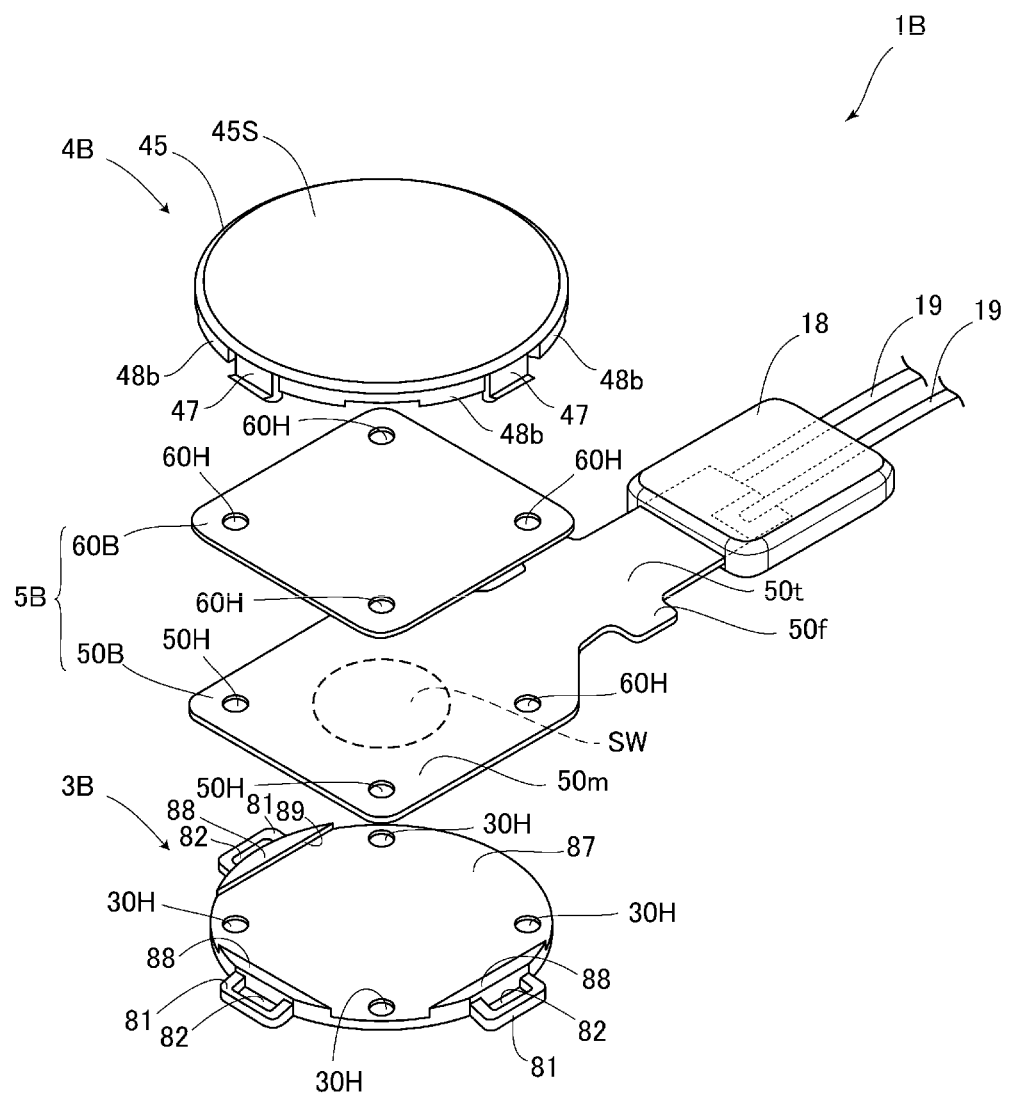
FIG. 8 is an exploded view illustrating a configuration of a load detection sensor unit according to a second embodiment of the invention.
Figure 9:
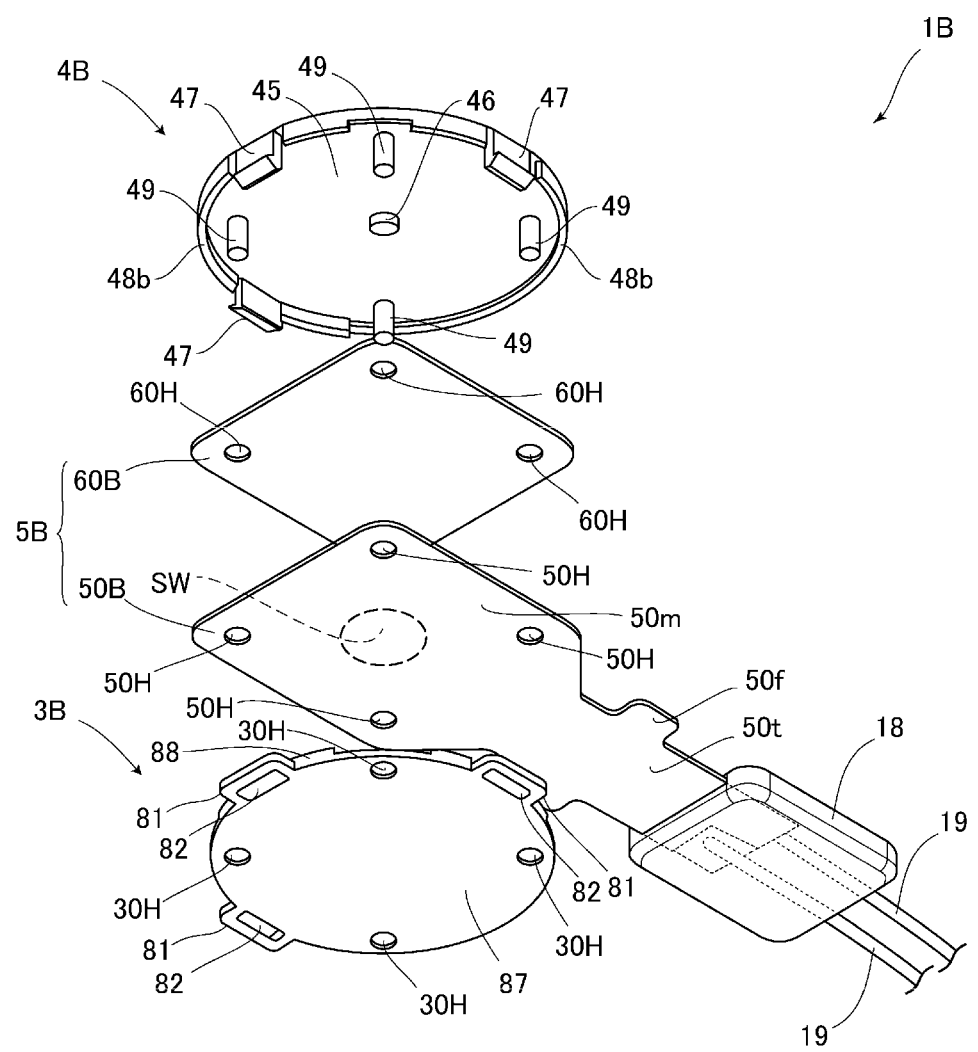
FIG. 9 is a diagram illustrating the load detection sensor unit of FIG. 8 when viewed from a different angle.
Figure 10:
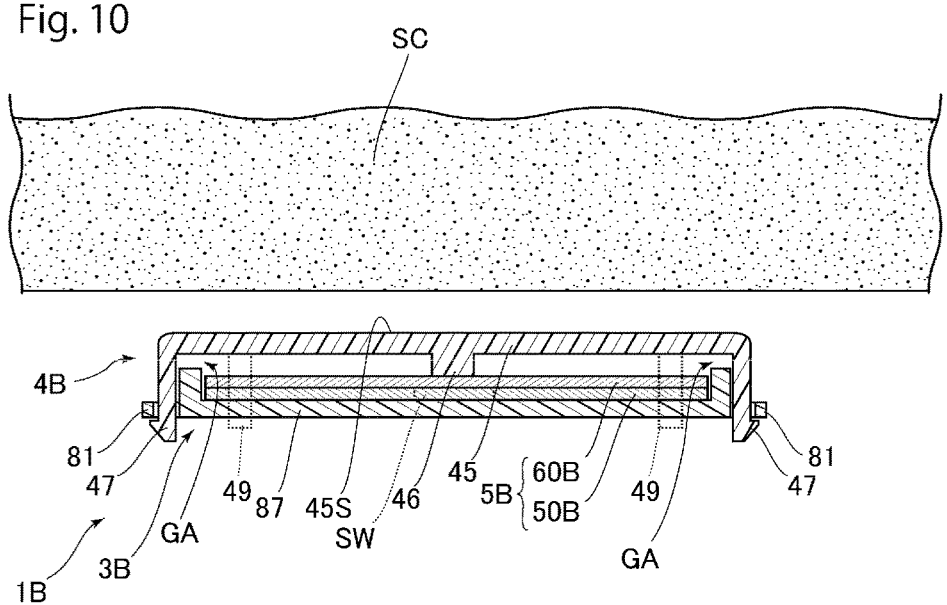
FIG. 10 is a cross-sectional view of the load detection sensor unit of FIGS. 8 and 9.

FIG. 8 is an exploded view illustrating a configuration of a load detection sensor unit according to the second embodiment of the invention and FIG. 9 is a diagram illustrating the load detection sensor unit of FIG. 8 when viewed from a different angle. Further, FIG. 10 is a cross-sectional view of the load detection sensor unit of FIGS. 8 and 9. As illustrated in FIGS. 8 to 10, a load detection sensor unit 1B of the embodiment mainly includes a housing 3B, a housing cover 4B, and a load detection sensor 5B. Additionally, a pedestal is not described in FIGS. 8 to 10, but in the embodiment the load detection sensor unit 1B may not include the pedestal.

As illustrated in FIGS. 8 and 9, the housing 3B includes a bottom wall 87, a plurality of frame walls 88, and a plurality of arms 81. The bottom wall 87 is formed in a substantially circular plate shape and the frame walls 88 are connected to three positions on the outer periphery of the bottom wall 87. The frame wall 88 is formed so that an outer shape has the substantially same shape as that of the outer periphery of the bottom wall 87 and an inner shape is formed in a flat surface shape. Further, the bottom wall 87 is provided with a plurality of penetration holes 30H.

The frame walls 88 are disposed at the interval of 90° about the substantial center of the substantially circular bottom wall 87, the inner surfaces of the adjacent frame walls 88 form an angle of 90°, and the inner surfaces 89 of the facing frame walls 88 face each other. The inner surfaces 89 are substantially parallel to any one of lines connecting the centers of the adjacent penetration holes 30H. Further, the arm 81 is connected to the outer periphery of each frame wall 88. An opening 82 is formed in each arm 81 by punching. Further, the frame wall 88 and the arm 81 are formed at three positions in the embodiment and are not provided in a direction in which the load detection sensor unit 1B extends.

The housing cover 4B is a lid member that covers the bottom wall 87 and the frame wall 88 and is a pressing member that is pressed against the sheet cushion SC illustrated in FIG. 10 to press the switch of the load detection sensor 5B. The housing cover 4B includes a top wall 45 and a frame wall 48b. The top wall 45 is a substantially circular plate-shaped member. Further, the frame wall 48b of the housing cover 4B is divided into a plurality of parts and is connected to the outer peripheral shape of the top wall 45. The hook piece 47 is connected to the top wall 45 between the plurality of divided frame walls 48b. Each hook piece 47 is fitted into the opening 82 formed in the arm 81 of the housing 3B. When each hook piece 47 is fitted into the opening 82, the relative movement between the housing 3B and the housing cover 4B in the plane direction of the bottom wall 87 or the top wall 45 is regulated.

The top wall 45 of the housing cover 4B is provided with a pressing portion 46 which protrudes from the inner surface facing the bottom wall 87 of the housing 3B. The pressing portion 46 is formed in the same shape as that of the pressing portion 43 of the first embodiment except that the front end is formed in a flat surface shape, but the front end may be formed in a protruding curved surface shape. Further, the top wall 45 of the housing cover 4B is provided with a plurality of ribs 49 which protrude from an inner surface on the same side as the installation side of the pressing portion 46. These ribs 49 are formed at positions overlapping the plurality of penetration holes 30H formed in the bottom wall 87 of the housing 3B. These ribs 49 are respectively inserted into the penetration holes 30H while the housing cover 4B covers the housing 3B and each hook piece 47 is fitted into each opening 82. Further, a front end of the pressing portion 46 contacts the load detection sensor 5B in this state. Thus, similarly to the pressing portion 43 of the first embodiment, the front end of the pressing portion 46 contacts the switch of the load detection sensor 5B while the housing cover 4B is not pressed against the sheet cushion SC as below.

Additionally, even in the embodiment, the housing cover 4B is formed of a material harder than the sheet cushion SC similarly to the first embodiment and the pressing portion 46 which is a part of the housing cover 4B is also formed of a material harder than the sheet cushion SC. Thus, the housing cover 4B of the embodiment is formed of the same material as that of the housing cover 4A of the first embodiment.

In this way, the top wall 45 of the housing cover 4B and the frame wall 88 of the housing 3B are separated from each other to form the gap GA as illustrated in FIG. 10 while the pressing portion 46 of the housing cover 4B contacts the load detection sensor 5B.

In a state where the load detection sensor unit 1A assembled in this way is disposed below the sheet cushion SC of the seat device, a top surface 45S of the top wall 45 of the housing cover 4B faces the lower surface of the sheet cushion SC with a predetermined distance interposed therebetween. The top surface 45S is formed in a flat surface shape. The top surface 45S is a surface which is pressed against the sheet cushion SC and can be understood as the pressure receiving surface of the load detection sensor unit 1B. An area of the top surface 45S is set to be larger than an area in which the pressing portion 46 contacts the load detection sensor 5B.

Next, the load detection sensor 5B of the embodiment will be described.

Figure 11:
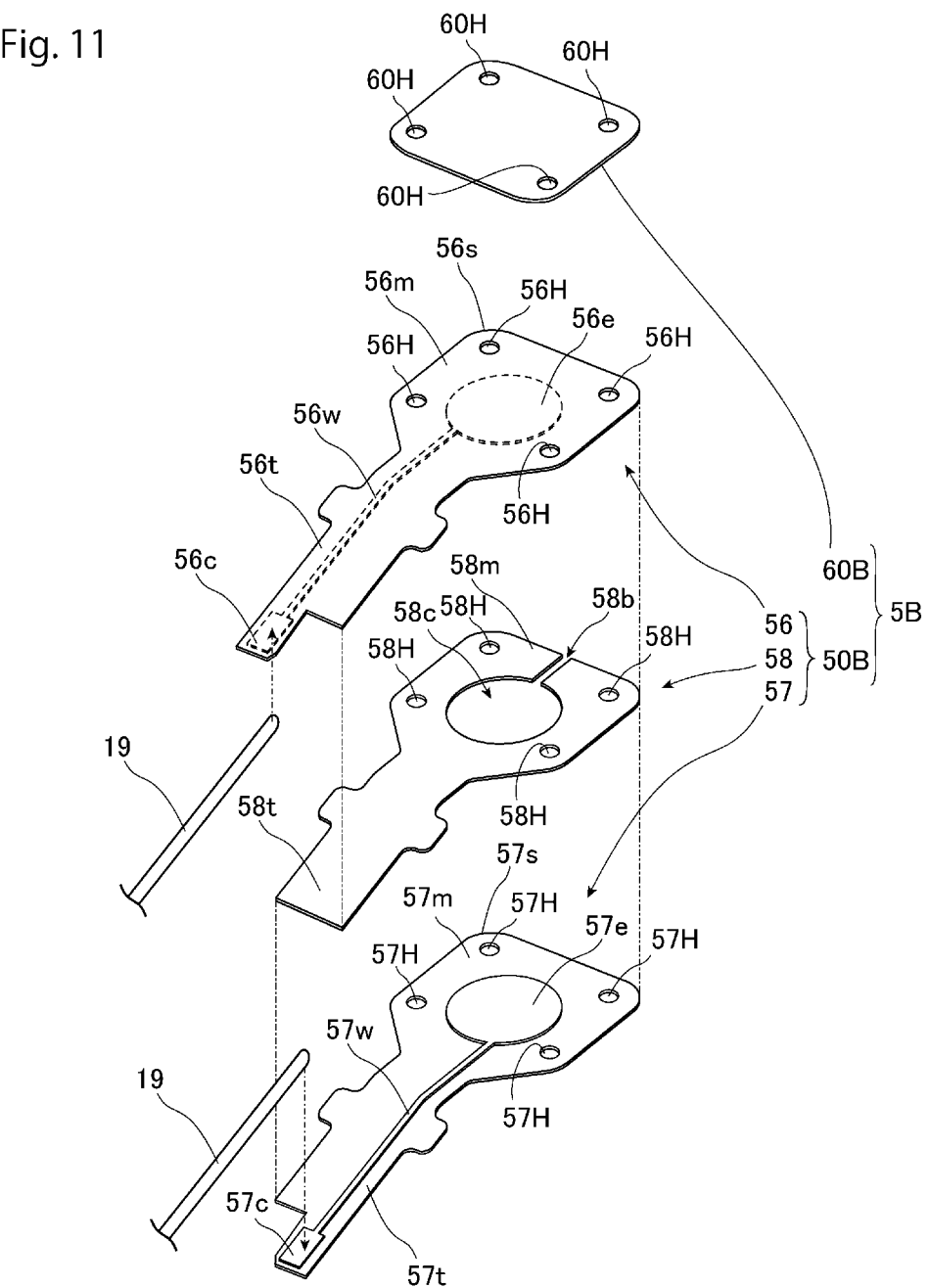
FIG. 11 is an exploded view illustrating a configuration of a switch sheet of FIGS. 8 and 9.

FIG. 11 is an exploded view illustrating the load detection sensor 5B of FIGS. 8 and 9. Here, the viewing directions of FIGS. 8, 9 and 11 are changed in order to help the comprehension. As illustrated in FIGS. 8 to 11, the load detection sensor 5B of the embodiment includes a switch sheet 50B including a switch SW and a metal plate 60B.

As illustrated in FIGS. 8 and 9, the switch sheet 50B of the embodiment is configured as a sheet-shaped membrane switch. The switch sheet 50B includes a main block 50m which has a substantially rectangular shape and a tail block 50t which is connected to the main block 50m and is narrower than the main block 50m. The main block 50m is provided with the switch SW. Further, a wide blade portion 50f is formed in the tail block 50t. Further, a penetration hole 50H is formed in the vicinity of each of apexes of the main block 50m.

As illustrated in FIG. 11, the switch sheet 50B of the embodiment includes a first electrode sheet 56, a spacer 58, and a second electrode sheet 57.

The first electrode sheet 56 mainly includes a first insulation sheet 56s, a first electrode 56e, and a first terminal 56c.

The first insulation sheet 56s includes a main block 56m which is formed of an insulation sheet having flexibility and has the same shape as the main block 50m of the switch sheet 50B and a tail block 56t which is connected to the main block 56m and has the substantially same shape as the tail block 50t of the switch sheet 50B. The shape of the tail block 56t is different from the shape of the tail block 50t of the switch sheet 50B in that a front end portion opposite to the main block 56m is narrower than other portions of the tail block 56t. Further, the main block 56m is provided with a penetration hole 56H which is formed at the same position as that of the penetration hole 50H of the switch sheet 50B. As a material of the first insulation sheet 56s, a resin such as polyethylene terephthalate (PET), polyimide (PI), and polyethylene naphthalate (PEN) can be exemplified.

The first electrode 56e is formed on one surface to be located at the substantially center of the main block 56m. The first electrode 56e is formed as a conductor layer, for example, a substantially circular metal printed layer. The first terminal 56c is formed as a conductor layer, for example, a substantially square metal layer. The first terminal 56c is formed on a surface on the installation side of the first electrode 56e at the front end portion of the tail block 56t. Further, the first electrode 56e and the first terminal 56c are electrically connected to each other through a first wire 56w.

The second electrode sheet 57 mainly includes a second insulation sheet 57s, a second electrode 57e, and a second terminal 57c.

The second insulation sheet 57s is formed as the same insulation sheet as that of the first insulation sheet 56s. In the case of the embodiment, the second insulation sheet 57s includes a main block 57m which has the same shape as that of the main block 56m of the first insulation sheet 56s and a tail block 57t which is connected to the main block 57m and has the same shape as that of the tail block 56t of the first insulation sheet 56s except for the front end portion. The front end portion of the tail block 57t is narrower than other portions of the tail block 57t. When the first insulation sheet 56s and the second insulation sheet 57s overlap each other, the front end portion of the tail block 56t of the first insulation sheet 56s and the front end portion of the tail block 57t of the second insulation sheet 57s do not overlap each other. Further, the main block 57m is provided with a penetration hole 57H which is formed at the same position as that of the penetration hole 50H of the switch sheet 50B similarly to the first insulation sheet 56s. As a material of the second insulation sheet 57s, a resin such as PET, PI, or PEN can be exemplified similarly to the first insulation sheet 56s. Then, the material of the second insulation sheet 57s may be the same as or different from the material of the first insulation sheet 56s.

The second electrode 57e has the same configuration as that of the first electrode 56e and is provided on one surface of the main block 57m of the second insulation sheet 57s to be located at the substantially center thereof. Further, the installation position of the second electrode 57e is set as a position overlapping the first electrode 56e when the first electrode sheet 56 and the second electrode sheet 57 overlap each other. The second terminal 57c has the same configuration as that of the first terminal 56c and is provided on a surface on the installation side of the second electrode 57e at the front end portion of the tail block 57t. Further, since the front end portions of the insulation sheets do not overlap each other when the first insulation sheet 56s and the second insulation sheet 57s overlap each other as described above, the first terminal 56c and the second terminal 57c are exposed while not being located between the first insulation sheet 56s and the second insulation sheet 57s. Further, the second electrode 57e and the second terminal 57c are electrically connected to each other through the second wire 57w.

The spacer 58 includes a main block 58m which is formed of an insulation sheet having flexibility and a tail block 58t which is connected to the main block 58m. The main block 58m is formed so that an outer shape is the same as those of the main blocks 56m and 57m of the first insulation sheet 56s and the second insulation sheet 57s. Further, an opening 58c is formed at the center of the main block 58m. Further, a penetration hole 58H is formed at the same position as that of the penetration hole 50H of the switch sheet 50B similarly to the first insulation sheet 56s and the second insulation sheet 57s. The tail block 58t is formed in a shape in which the front end portions having a narrow width in the tail blocks 56t and 57t of the first insulation sheet 56s and the second insulation sheet 57s are excluded.

The opening 58c has a substantially circular shape and has a diameter which slightly smaller than the diameters of the first electrode 56e and the second electrode 57e. Then, the opening 58c is formed so that the opening 58c is located at the inside of the peripheral edges of the first electrode 56e and the second electrode 57e in the top view of the spacer 58 when the spacer 58 overlaps the first electrode sheet 56 and the second electrode sheet 57. Further, the spacer 58 is provided with a slit 58b which connects a space inside the opening 58c to a space outside the switch sheet 50B. The slit 58b is formed as an air vent when the first electrode sheet 56, the spacer 58, and the second electrode sheet 57 overlap one another.

As a material of the spacer 58, a resin such as PET, PI, or PEN can be exemplified similarly to the first insulation sheet 56s and the second insulation sheet 57s. Additionally, the material of the spacer 58 may be the same as or different from that of the first insulation sheet 56s or the second insulation sheet 57s. Further, an adhesive (not illustrated) is applied to both surfaces of the spacer 58 so that the first electrode sheet 56 and the second electrode sheet 57 adhere thereto.

In a state where the first electrode sheet 56, the spacer 58, and the second electrode sheet 57 adhere to one another in this order, the first electrode 56e and the first wire 56w of the first electrode sheet 56 and the second electrode 57e and the second wire 57w of the second electrode sheet 57 are located between the first insulation sheet 56s and the second insulation sheet 57s. Then, the first electrode 56e and the second electrode 57e face each other with the opening 58c interposed therebetween to form the switch SW. Further, the penetration holes 56H, 57H, and 58H overlap one another to form the penetration hole 50H of the switch sheet 50B in a state where the first electrode sheet 56, the spacer 58, and the second electrode sheet 57 overlap one another.

Further, signal cables 19 connected to a control device (not illustrated) are respectively connected to the first terminal 56c and the second terminal 57c of the switch sheet 50B. The first terminal 56c and the second terminal 57c are respectively connected to the signal cables 19 by conductive paste or soldering. The end of the tail block 50t of the switch sheet 50B including the first terminal 56c and the second terminal 57c connected to the signal cables 19 is covered by a terminal sealing resin 18 as illustrated in FIGS. 8 and 9. The terminal sealing resin 18 is, for example, hot melt or light curing resin. In this way, the separation of the signal cables 19 from the first terminal 56c and the second terminal 57c is suppressed and the short-circuit of the first terminal 56c and the second terminal 57c due to dust or the like is suppressed.

Further, the metal plate 60B is formed of a metal plate member having flexibility. The metal plate 60B is formed of, for example, the same material as that of the metal plate 61 of the second electrode sheet 60 of the first embodiment. The metal plate 60B is formed in the substantially same shape as that of the main block 50m of the switch sheet 50B and a penetration hole 60H is formed at the same position as that of the penetration hole 50H of the switch sheet 50B. Thus, the penetration hole 50H of the switch sheet 50B and the penetration hole 60H of the metal plate 60B overlap each other when the switch sheet 50B and the metal plate 60B overlap each other. Further, the metal plate 60B covers the switch SW of the switch sheet 50B when the switch sheet 50B and the metal plate 60B overlap each other. Specifically, as obvious from FIG. 11, the metal plate 60B is provided at the opposite side to the spacer 58 of the first insulation sheet 56s and covers the first electrode 56e located near the sheet cushion SC among the first electrode 56e and the second electrode 57e from the sheet cushion SC. Additionally, in the embodiment, the metal plate 60B and the first insulation sheet 56s (the switch sheet 50B) do not adhere to each other.

The load detection sensor 5B with the above-described configuration is disposed on the bottom wall 87 of the housing 3B as illustrated in FIGS. 8 to 10. Specifically, the main block 50m of the switch sheet 50B including the switch SW is located on the bottom wall 87 of the housing 3B. Then, since the frame wall 88 and the arm 81 of the housing 3B are not provided in a direction in which the load detection sensor unit 1B extends as described above, the tail block 50t of the switch sheet 50B, the terminal sealing resin 18, and the pair of signal cables 19 are drawn from the housing 3B.

Further, the front end of the pressing portion 46 contacts a position overlapping the switch SW in the metal plate 60B of the load detection sensor 5B as described above while the housing cover 4B covers the housing 3B in which the load detection sensor 5B is disposed and each hook piece 47 is fitted into each opening 82 as described above. An area in which the pressing portion 46 contacts the metal plate 60B is smaller than an area of the first electrode 56e pressed against the metal plate 60B and an area of the top surface 45S corresponding to the pressure receiving surface is larger than an area of the first electrode 56e. Further, in this state, each rib 49 is inserted into each penetration hole 60H of the metal plate 60B and each penetration hole 50H of the switch sheet 50B and is inserted into each penetration hole 30H of the housing 3B. Thus, a relative positional deviation between the switch sheet 50B and the metal plate 60B is suppressed even when the metal plate 60B and the first insulation sheet 56s do not adhere to each other as described above. Thus, the rib 49 can be understood as the second movement regulation member that regulates the relative movement between the switch sheet 50B and the metal plate 60B in the plane direction, that is, the relative movement of the first insulation sheet 56s, the second insulation sheet 57s, and the metal plate 60B in the plane direction. Further, the rib 49 can be understood as the first movement regulation member that regulates the relative movement between the housing cover 4B and the metal plate 60B in the plane direction of the metal plate 60B.

Next, a case in which seating is detected by the load detection sensor unit 1B of the embodiment will be described.

When a person sits on the seat device, the lower surface of the sheet cushion SC moves downward by the weight of the person and the lower surface of the sheet cushion SC contacts the top surface 45S of the housing cover 4B to press the top surface 45S similarly to the description of the first embodiment. Then, when the lower surface of the sheet cushion SC moves further downward, the front end of the pressing portion 46 presses the metal plate 60B and the first insulation sheet 56s is also bent by the bending of the metal plate 60B. As a result, the first electrode 56e contacts the second electrode 57e and the switch SW of the load detection sensor 5B is turned on. Then, the seating is detected by a vehicle control unit (not illustrated) connected to the signal cable 19. Even in the embodiment, since an area of the top surface 45S is larger than an area of the first electrode 56e pressed by the metal plate 60B similarly to the first embodiment, the sheet cushion SC can transmit a force to the top surface 45S from a position other than a position right above the first electrode 56e. For this reason, since a pressing force can more appropriately concentrate on the pressing portion 46, the metal plate 61 can be more appropriately bent.

Additionally, in the embodiment, the relative movement between the switch sheet 50B and the metal plate 60B in the plane direction or the relative movement between the metal plate 60B and the housing cover 4B is regulated by the rib 49. However, the rib 49 is not essential. In this case, for example, the movement of the switch sheet 50B and the metal plate 60B in the plane direction may be regulated by the inner surface 89 of the frame wall 88 of the housing 3B so as to regulate the relative movement between the metal plate 60B and the switch sheet 50B in the plane direction. Alternatively, the relative movement between the metal plate 60B and the housing cover 4B may be regulated by the hook piece 47. Here, in this case, a frame wall may be formed to regulate the movement of the switch sheet 50B and the metal plate 60B in a direction from the main block 50m of the switch sheet 50B to the tail block 50t in addition to the frame wall 88 of the embodiment described in FIGS. 8 and 9.

(Third Embodiment)

Next, a third embodiment of the invention will be described. Additionally, in the description of the embodiment, the same reference numerals will be given to the components which are the same as or equivalent to those of the first embodiment and a repetitive description thereof will be omitted unless otherwise specified.

Figure 12:
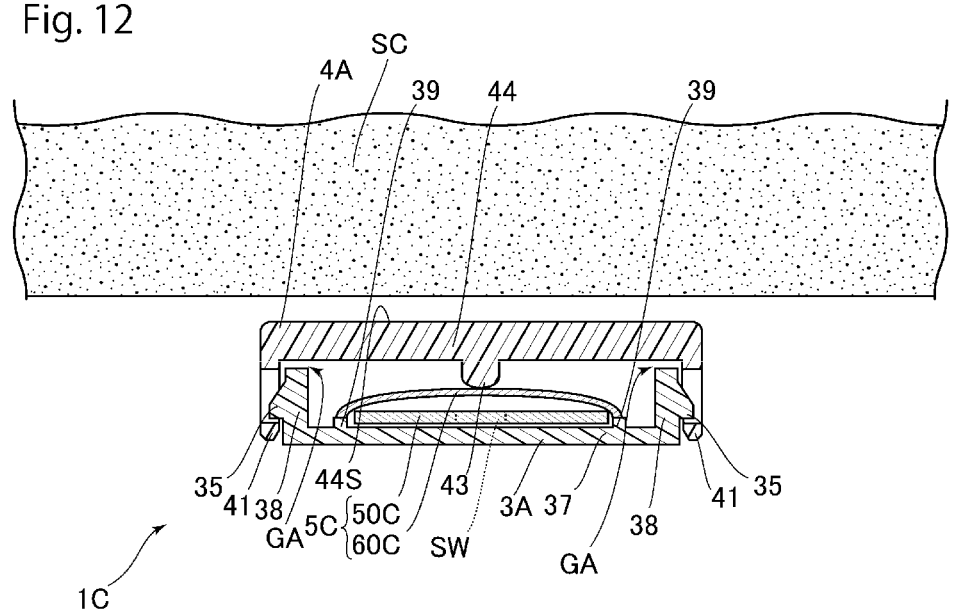
FIG. 12 is a cross-sectional view illustrating a configuration of a load detection sensor unit according to a third embodiment of the invention.

FIG. 12 is a cross-sectional view illustrating a configuration of a load detection sensor unit according to the third embodiment of the invention. As illustrated in FIG. 12, a load detection sensor unit 1C of the embodiment is different from the load detection sensor unit 1A of the first embodiment in that a load detection sensor 5C is used instead of the load detection sensor 5A.

The load detection sensor 5C of the embodiment includes a metal plate 60C and the switch sheet 50C which is the same as the switch sheet 50B of the second embodiment. The metal plate 60C has a width larger than that of the switch sheet 50C differently from the metal plate 60B of the second embodiment. Further, the metal plate 60C of the embodiment covers the switch SW of the switch sheet 50C, but a portion covering the first electrode and the second electrode of the switch SW is separated from the first electrode sheet and the second electrode sheet of the switch sheet 50C. Specifically, the configuration is as below. The housing 3A of the embodiment includes a pair of ribs 39 formed at a position surrounded by the frame wall 38. A distance between the ribs 39 is set to be smaller than the width of the metal plate 60C, both ends of the metal plate 60C are fixed to the ribs 39, and the metal plate 60C is bent. By this bending, a portion covering the first electrode and the second electrode of the switch SW is separated from the first electrode sheet and the second electrode sheet of the switch sheet 50C as described above. Then, the front end of the pressing portion 43 of the housing cover 4A contacts a portion covering the first electrode and the second electrode of the metal plate 60C.

Even in the detection of the seating by the load detection sensor unit 1C of the embodiment, when a person sits on the seat device, the lower surface of the sheet cushion SC moves downward by the weight of the person and the lower surface of the sheet cushion SC presses the top surface 44S of the housing cover 4A similarly to the description of the first embodiment. Then, when the lower surface of the sheet cushion SC moves further downward, the front end of the pressing portion 43 presses the metal plate 60C so that the metal plate 60C is bent from the state of FIG. 12. Accordingly, since the first electrode and the second electrode of the switch sheet 50C contact each other, the seating is detected.

According to the load detection sensor unit 1C of the embodiment, since the metal plate 60C is separated from the insulation sheet of the switch sheet 50C, it is possible to suppress the contact of the electrode due to the slight bending of the metal plate 60C. Thus, an erroneous detection that seating is detected when the sheet cushion is bent by a baggage or the like loaded on the seat surface of the seat device can be suppressed.

Additionally, in the embodiment, the metal plate 60C may be formed of bimetal. In this case, it is desirable that the metal plate 60C be formed of bimetal so that a portion covering the first electrode and the second electrode of the switch SW is defamed to move away from the first electrode and the second electrode in accordance with an increase in temperature. As in the embodiment, when the electrode is formed on the resinous insulation sheet, the insulation sheet is easily deformed in accordance with an increase in temperature and thus the switch SW is easily turned on by a weak force in accordance with an increase in temperature. Further, metal does not greatly flexibly change even when a temperature changes, but it does not mean that the flexibility does not change at all. Here, since the metal plate 60C is formed of bimetal which is deformed to be separated from the electrode in accordance with an increase in temperature, the metal plate is easily bent or the switch SW is easily turned on by a weak force in accordance with an increase in temperature. Since the metal plate is separated from the electrode, a change in seating detection can be suppressed. Thus, the seating can be more appropriately detected.

While the load detection sensor unit of the invention has been described by the above-described embodiments, the invention is not limited to the above-described embodiments.

For example, the pressing portions 43 and 46 of the embodiments may be separated from the metal plate in a state other than the seating detection state.

For example, the pedestal 2A of the first embodiment is not essential. In this case, the load detection sensor unit 1A of the first embodiment may have a configuration in which the hook portion 22 of the pedestal 2A is provided in the housing 3A. Further, the load detection sensor unit 1A may not be fixed to the S spring of the seat device and may be disposed on a seat pan of the seat device by removing the pedestal 2A and changing the shape of the housing 3A.

Further, the load detection sensor unit 1B of the second embodiment may have the same pedestal as that of the first embodiment and may be fixed to the S spring of the seat device.

Further, it has been described that the metal plate 60B and the switch sheet 50B do not adhere to each other in the second embodiment, but the metal plate 60B and the switch sheet 50B may adhere to each other. Here, since the adhesive becomes soft or hard in accordance with a change in temperature, it is desirable that the metal plate 60B and the switch sheet 50B do not adhere to each other as described above due to a change in on-load.

Further, the components of the load detection sensor units 1A, 1B, and 1C may be combined, omitted, and modified or known techniques may be added without departing from the object of the invention in addition to the content described in the above-described embodiments or modified examples.

Further, in the above-described embodiments, as illustrated in FIGS. 2, 10, and 12, a case in which the lower surface of the sheet cushion SC is separated from the load detection sensor unit in a non-seating state has been described. However, the lower surface of the sheet cushion SC may contact the load detection sensor unit in the non-seating state.

As described above, according to the invention, it is possible to provide the load detection sensor unit capable of suppressing an erroneous seating detection while appropriately detecting seating.

REFERENCE SIGNS LIST 1A, 1B, 1C . . . load detection sensor unit
2A . . . pedestal
3A, 3B . . . housing
4A, 4B . . . housing cover
5A, 5B, 5C . . . load detection sensor
43, 46 . . . pressing portion
50B, 50C . . . switch sheet
50, 56 . . . first electrode sheet
51 . . . substrate
52, 56e . . . first electrode
56s . . . first insulation sheet
57, 60 . . . second electrode sheet
62, 57e . . . second electrode
57s . . . second insulation sheet
70, 58 . . . spacer
61, 60B, 60C . . . metal plate
SC . . . sheet cushion
SW . . . switch

The invention claimed is:

1. A load detection sensor unit which is disposed below a sheet cushion, comprising:
a load detection sensor which includes a pair of electrodes facing each other with a predetermined gap interposed therebetween and a metal plate covering at least a part of one electrode located near the sheet cushion among the pair of electrodes from the sheet cushion;
a pressing member that includes a pressing portion pressed against the sheet cushion and harder than the sheet cushion; and
a first movement regulation member that regulates a relative movement between the pressing member and the metal plate in a plane direction of the metal plate,
wherein the pair of electrodes contacts each other when the metal plate is bent in a case in which the pressing portion presses a part of the metal plate.

2. The load detection sensor unit according to claim 1, wherein the pressing member further includes a pressure receiving surface pressed against the sheet cushion, and
wherein an area of the pressure receiving surface is larger than an area in which the pressing portion contacts the metal plate.

3. The load detection sensor unit according to claim 2, wherein the area of the pressure receiving surface is larger than an area of the one electrode.

4. The load detection sensor unit according to claim 1, wherein the pressing portion contacts the metal plate while not being pressed against the sheet cushion.

5. The load detection sensor unit according to claim 1, wherein the load detection sensor further includes a sheet-shaped spacer having an opening formed therein and a pair of insulation sheets formed on both surfaces of the spacer,
wherein the pair of electrodes is provided on a surface near the spacer in the insulation sheets respectively and faces each other with the opening interposed therebetween, and
wherein the metal plate is provided at the opposite side to the spacer of one of the insulation sheets.

6. The load detection sensor unit according to claim 5, wherein the pair of insulation sheets and the metal plate do not adhere to each other.

7. The load detection sensor unit according to claim 6, further comprising:
a second movement regulation member that regulates a relative movement between the pair of insulation sheets and the metal plate in a plane direction of the pair of insulation sheets.

8. The load detection sensor unit according to claim 7, wherein the second movement regulation member is a part of a housing accommodating the load detection sensor.

9. The load detection sensor unit according to claim 6, wherein the metal plate is formed of bimetal which is deformed to be separated from the electrode in accordance with an increase in temperature.

10. The load detection sensor unit according to claim 5, wherein a portion covering at least the electrode in the metal plate is separated from the one of the insulation sheets.

11. The load detection sensor unit according to claim 1, wherein the one electrode covered by the metal plate is integrated with the metal plate and the electrode is a part of the metal plate.

12. A load detection sensor unit which is disposed below a sheet cushion, comprising:
a load detection sensor which includes a pair of electrodes facing each other with a predetermined gap interposed therebetween and a metal plate covering at least a part of one electrode located near the sheet cushion among the pair of electrodes from the sheet cushion;
a pressing member that includes a pressing portion pressed against the sheet cushion and harder than the sheet cushion,
wherein the pair of electrodes contacts each other when the metal plate is bent in a case in which the pressing portion presses a part of the metal plate,
wherein the load detection sensor further includes a sheet-shaped spacer having an opening formed therein and a pair of insulation sheets formed on both surfaces of the spacer,
wherein the pair of electrodes is provided on a surface near the spacer in the insulation sheets respectively and faces each other with the opening interposed therebetween, and
wherein the metal plate is provided at the opposite side to the spacer of one of the insulation sheets, and
wherein the pair of insulation sheets and the metal plate do not adhere to each other.

13. A load detection sensor unit which is disposed below a sheet cushion, comprising:
a load detection sensor which includes a pair of electrodes facing each other with a predetermined gap interposed therebetween and a metal plate covering at least a part of one electrode located near the sheet cushion among the pair of electrodes from the sheet cushion;
a pressing member that includes a pressing portion pressed against the sheet cushion and harder than the sheet cushion,
wherein the pair of electrodes contacts each other when the metal plate is bent in a case in which the pressing portion presses a part of the metal plate,
wherein the load detection sensor further includes a sheet-shaped spacer having an opening formed therein and a pair of insulation sheets formed on both surfaces of the spacer,
wherein the pair of electrodes is provided on a surface near the spacer in the insulation sheets respectively and faces each other with the opening interposed therebetween, and
wherein the metal plate is provided at the opposite side to the spacer of one of the insulation sheets, and
wherein a portion covering at least the electrode in the metal plate is separated from the one of the insulation sheets.

* * * * *